US008718299B2

(12) United States Patent
Nishimura et al.

(10) Patent No.: US 8,718,299 B2
(45) Date of Patent: May 6, 2014

(54) AUDIO CONTROL DEVICE AND AUDIO OUTPUT DEVICE

(75) Inventors: Hideki Nishimura, Kawasaki (JP); Junichi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 239 days.

(21) Appl. No.: 13/067,682

(22) Filed: Jun. 20, 2011

(65) Prior Publication Data

US 2011/0255709 A1 Oct. 20, 2011

Related U.S. Application Data

(63) Continuation of application No. PCT/JP2009/050117, filed on Jan. 8, 2009.

(51) Int. Cl.
*H04R 3/00* (2006.01)
*G06F 17/00* (2006.01)

(52) U.S. Cl.
USPC .............................................. 381/92; 381/122

(58) Field of Classification Search
USPC .................................... 381/92, 104, 113, 112
See application file for complete search history.

(56) References Cited

U.S. PATENT DOCUMENTS 6,658,310 B1 * 12/2003 Kamiya .......................... 700/94
2004/0207544 A1 * 10/2004 Choi ............................... 341/56
2007/0133826 A1 * 6/2007 Burk et al. ..................... 381/122
2008/0111620 A1 * 5/2008 Menard et al. .................. 330/10
2008/0112570 A1 * 5/2008 Asada et al. ................. 381/71.6
2008/0284508 A1 * 11/2008 Walker et al. .................... 330/10
2009/0003629 A1 * 1/2009 Shajaan et al. ................ 381/113
2009/0106021 A1 * 4/2009 Zurek et al. .................... 704/226
2009/0316731 A1 * 12/2009 Kong ............................ 370/544

FOREIGN PATENT DOCUMENTS

JP 03-504666 10/1991
JP 04-318796 11/1992
JP 04-322598 11/1992
JP 07-177103 7/1995
JP 2004-320753 11/2004
JP 2006-140931 6/2006
WO WO 90/10980 9/1990

OTHER PUBLICATIONS

International Search Report for PCT/JP2009/050117, Mailed Apr. 21, 2009.

* cited by examiner

*Primary Examiner* — Duc Nguyen
*Assistant Examiner* — Phan Le
(74) *Attorney, Agent, or Firm* — Staas & Halsey LLP

(57) ABSTRACT

An audio output device includes two digital microphone units that, upon receiving sound, convert the sound to PDM digital audio signals in which a state is represented by 1 or 0 in each predetermined period. The audio output device generates half-period digital audio signals, which are signals of a half period of the predetermined period, by using first digital audio signals and second digital audio signals that are the digital audio signals converted by the two digital microphones, where the states of the first digital audio signals are each reflected in one of two half periods corresponding to the predetermined period and states of the second audio signals are each reflected in the other half period. The audio output device then converts the half-period digital audio signals, which are generated by the generator, to analog audio signals and outputs the analog audio signals.

5 Claims, 13 Drawing Sheets

AUDIO CONTROL DEVICE AND AUDIO OUTPUT DEVICE

CROSS-REFERENCE TO RELATED APPLICATION

This application is a continuation of International Application No. PCT/JP2009/050117, filed on Jan. 8, 2009, the entire contents of which are incorporated herein by reference.

FIELD

The embodiments discussed herein are directed to an audio control device and an audio output device.

BACKGROUND

Technologies are known for extracting sound coming from a specific direction using a microphone array that includes multiple microphones. Specifically, when a user specifies a direction, a device that includes a microphone array extracts sound coming from the specific direction by subtraction of audio signals coming from other directions.

Devices that include a microphone array use PDM (pulse density modulation) digital microphones. Upon receiving sound, digital microphones convert the sound into digital audio signals by using PDM or, more specifically, convert the sound into digital audio signals in which a state is represented by "1" or "0" in each predetermined period.

Conventionally, a device that includes a microphone array subtracts the audio signals coming from one digital microphone from the digital audio signals coming from another digital microphone and outputs the result of the processing as digital audio signals ("0" or "1"). For example, when the device including the microphone array subtracts "0" from "1", "1(=1−0)" is used as the processing results.

Microphone devices are disclosed that are omnidirectional when receiving sounds at low frequency ranges and directional when receiving sounds at high frequency ranges. Furthermore, technologies that relate to radio communication systems are disclosed.

Patent Document 1: Japanese Laid-open Patent Publication No. 04-318796

Patent Document 2: Japanese Laid-open Patent Publication No. 04-322598

Patent Document 3: Japanese Laid-open Patent Publication No. 03-504666

The conventional technologies have a problem in that audio quality deteriorates. Specifically, in the conventional technologies, because processing results are output as digital audio signals, when "1" is extracted from "0", "0" is used as the processing result, not "−1 (=0−1)". This causes an error and thus the original sound is not reproduced authentically, which lowers the audio quality.

SUMMARY

According to an aspect of an embodiment of the invention, An audio control device includes a digital audio signal receiver that receives first digital audio signals and second digital audio signals that are PDM digital audio signals in which a state is represented by 1 or 0 in each predetermined period; and a generator that generates half-period digital audio signals, which are signals of a half period of the predetermined period, by using the first digital audio signals and the second digital audio signals, which are received by the digital audio signal receiver, where the states of the first digital audio signals are each reflected in one of two half periods corresponding to the predetermined period and states of the second audio signals are each reflected in the other half period.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. An overview of an audio output device according to an embodiment and the configuration and processing of the audio output device will be described in the order they appear in this sentence and then other embodiments will be described.

[a] First Embodiment

Overview of Audio Output Device

Figure 1:
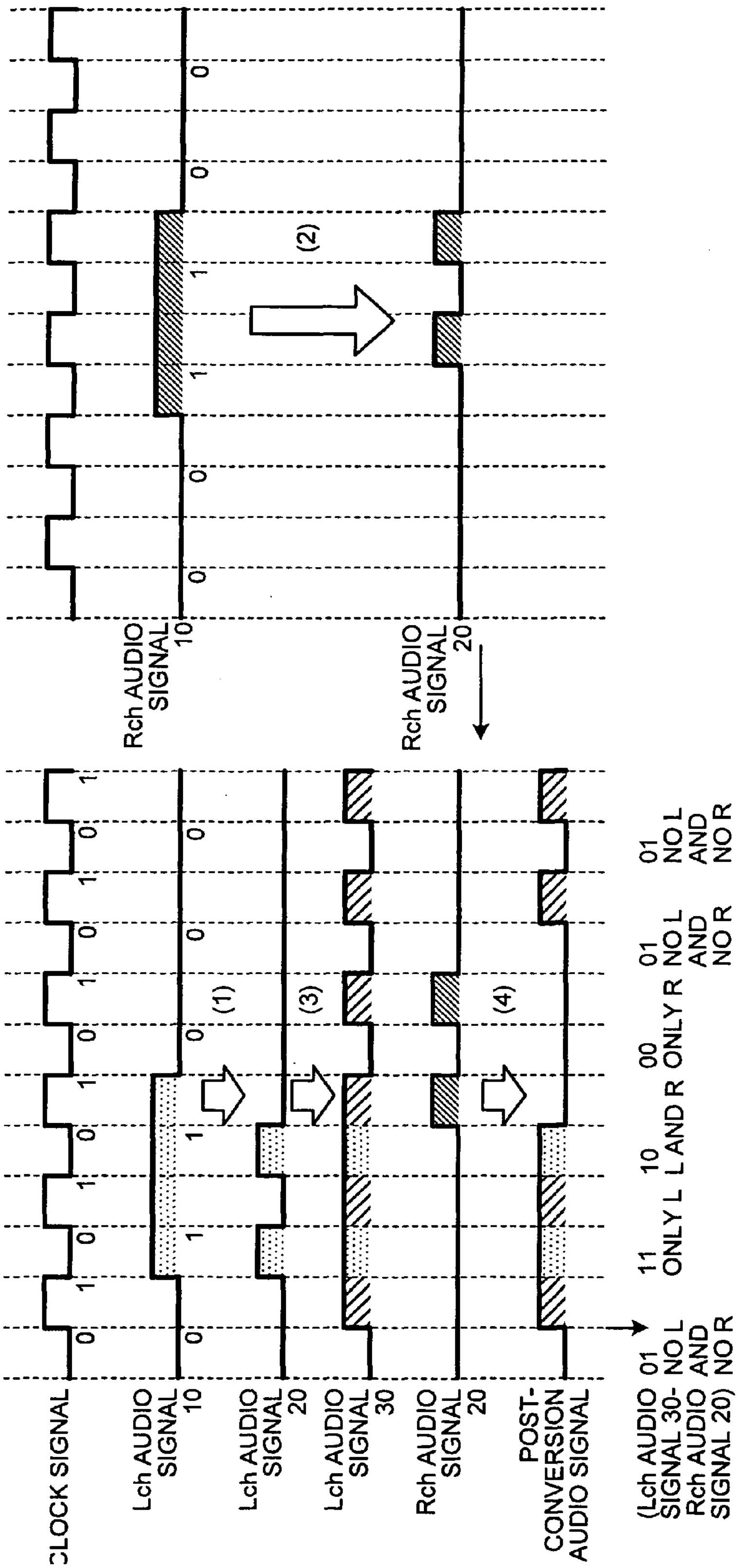
FIG. 1 is a diagram illustrating an overview of an audio output device according to a first embodiment of the present invention.

First, an overview of an audio output device according to a first embodiment of the present invention will be described using FIG. 1. FIG. 1 is a diagram illustrating the overview of the audio output device according to the first embodiment. The audio output device extracts sound coming from a specific direction and, more specifically, generates sound that is obtained by the subtraction of sound coming from a direction that is different from the specific direction.

The audio output device according to the first embodiment includes two digital microphones that, upon receiving sound, convert the sound to PDM digital audio signals in which the state is represented by 1 or 0 in each predetermined period.

The audio output device according to the first embodiment generates post-conversion digital audio signals (also referred to as half-period digital audio signals) that are digital audio signals from which sound coming from a direction that is different to a specific direction is subtracted. Specifically, as illustrated in FIG. 1, the audio output device according to the first embodiment generates post-conversion digital audio signals of half periods of predetermined periods using Lch audio signals 10 and Rch audio signals 10 that are digital audio signals obtained by conversion performed by the two digital microphones.

For example, the audio output device according to the first embodiment converts the Lch audio signals 10 to Lch audio signals 20 (see (1) of FIG. 1) and converts the Rch audio signals 10 to Rch audio signals 20 (see (2) in FIG. 1). More specifically, the audio output device converts the periods of Lch audio signals 10 and Rch audio signals 10 to half periods and the state of the Lch audio signals 10 and the state of the Rch audio signals 10 are each reflected in a different half period. As illustrated in the example in FIG. 1, the audio output device reflects the state of the Lch audio signal 10 in the Lch audio signals 20 only for each of the periods corresponding to periods in which the state of the clock signal is "0".

For example, as illustrated in FIG. 1, the audio output device according to the first embodiment converts the Lch audio signals 20 to Lch audio signals 30. In other words, the audio output device sets, to "1", the states of the half periods in which the periods of the Lch audio signals 10 are not reflected. The audio output device then subtracts the Rch audio signals 20 from the Lch audio signals 20 and the digital audio signals obtained as a result of the subtraction are used as post-conversion digital audio signals.

The audio output device according to the first embodiment then converts the generated post-conversion digital audio signals to analog audio signals and outputs the analog audio signals.

In this manner, the audio output device according to the first embedment can prevent the audio quality from deteriorating due to processing for extracting sound coming from the specific direction. Specifically, by representing the processing result using two bits for each predetermined period, "1", "0", and "−1" that can be used as processing results can be output as individual different digital audio signals, which prevents the audio quality from deteriorating.

Configuration of Audio Output Device

Figure 2:
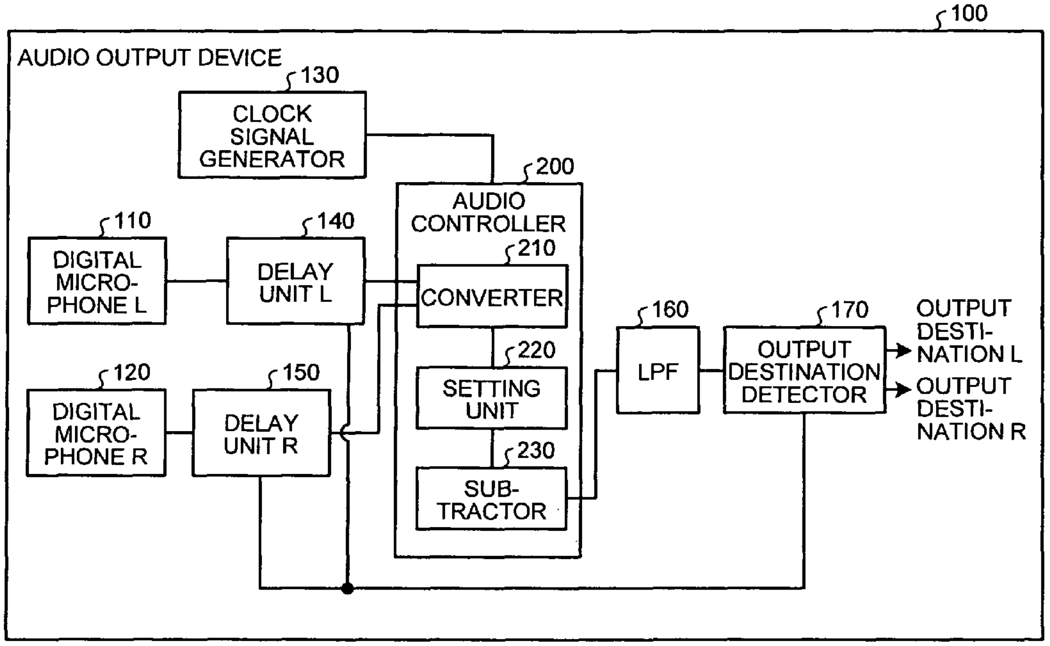
FIG. 2 is a block diagram illustrating a configuration of the audio output device according to the first embodiment.

A configuration of an audio output device 100 in FIG. 1 will be described using FIG. 2. FIG. 2 is a block diagram illustrating a configuration of the audio output device according to the first embodiment. As illustrated in FIG. 2, the audio output device 100 includes a digital microphone L 110, a digital microphone R 120, a clock signal generator 130, a delay unit L 140, a delay unit R 150, a low-pass filter 160, an output destination detector 170, and an audio controller 200. The audio controller 200 is referred to as "a digital audio signal receiver" "a generator". The low-pass filter 160 and an output destination detector 170 are referred to as "an output unit". The output destination detector 170 is referred to as "an accepting unit".

The digital microphone L 110 is connected to the delay unit L 140. The digital microphone L 110 is one of the multiple digital microphones of the audio output device 100 and is a PMD digital microphone. PMD digital microphones include, for example, audio receiving microphones for hands-free phones and audio inputting microphones for car navigation systems.

Upon receiving analog sound, the digital microphone L 110 converts the analog sound to digital audio signals by using PDM and transmits the converted digital audio signals to the delay unit L 140. Hereinafter, digital audio signals that the digital microphone L 110 transmits to the delay unit L 140 are referred to as "Lch audio signals 10 (also referred to as first digital audio signals or second digital audio signals)".

The digital microphone R 120 is connected to the delay unit R 150 and performs processing similar to that of the digital microphone L 110. Hereinafter, digital audio signals that the digital microphone R 120 transmits to the delay unit R 150 are referred to as "Rch audio signals 10 (also referred to as first digital audio signals or second digital audio signals)".

The digital microphone L 110 and the digital microphone R 120 are arranged separately at an arbitrary interval and, hereinafter, are described on the premise that they are arranged separately at an arrangement interval "X".

Figure 3:
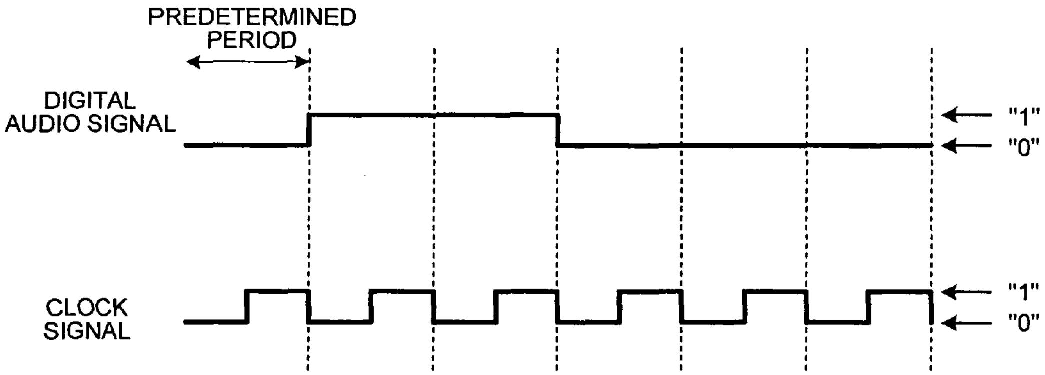
FIG. 3 is a diagram illustrating digital audio signals and clock signals of the first embodiment.

The Lch audio signals 10 and the Rch audio signals 10 will be described here using FIG. 3. The Lch audio signals 10 and the Rch audio signals 10 are signals that are obtained by converting analog signals by using PDM and, as illustrated in "DIGITAL AUDIO SIGNAL" in FIG. 3, in which the state is represented by "0" or "1" in each predetermined period. The predetermined period of the Lch audio signals 10 and the predetermined period of the Rch audio signals 10 are equal. FIG. 3 is a diagram illustrating digital audio signals and clock signals of the first embodiment.

The clock signal generator 130 is connected to the audio controller 200 and keeps transmitting predetermined clock signals to the audio controller 200. As the "CLOCK SIGNAL" in FIG. 3 indicates, the clock signals switches the state between "0" and "1" in each predetermined period. The period lengths of the clock signals that are transmitted by the clock signal generator 130 are half the predetermined periods of the Lch audio signals 10 and the Rch audio signals 10. In other words, the clock signals have two periods in each predetermined period of the Lch audio signals 10 and the Rch audio signals 10. The audio controller 200 may include the clock signal generator 130.

The delay unit L 140 is connected to the digital microphone L 110, the output destination detector 170, and the audio controller 200. The delay unit L 140 receives digital audio signals from the digital microphone L 110, and, more specifically, receives the Lch audio signals 10. If the output destination detector 170, which will be described below, sets a delay amount, the delay unit L 140 transmits the Lch audio signals 10 to which the set delay amount is added to the audio controller 200. If a delay amount is not set, the delay unit L 140 transmits the received Lch audio signals 10 directly to the audio controller 200.

The delay unit R 150 is connected to the digital microphone R 120, the output destination detector 170, and the audio controller 200. The delay unit R 150 performs processing similar to that of the delay unit L 140.

Figure 4:
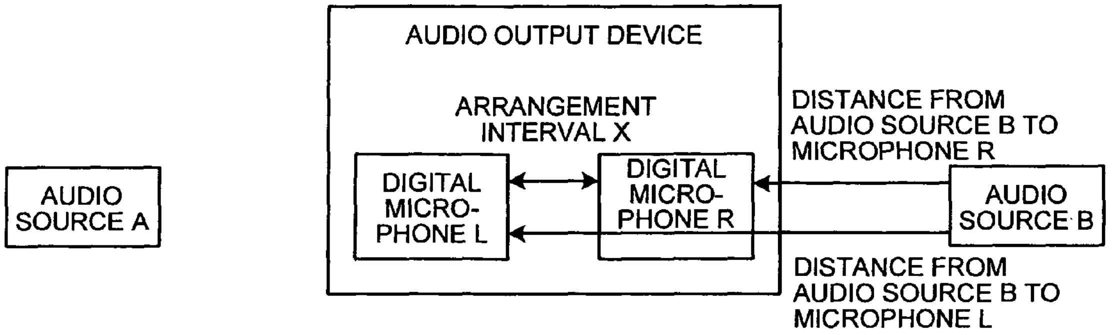
FIG. 4 is a diagram illustrating a delay unit of the first embodiment.

The delay amount that the delay unit L 140 or the delay unit R 150 adds will be briefly described here. FIG. 4 is a diagram illustrating the delay unit in the first embodiment. A description will be given, where, as described in FIG. 4, the digital microphone L 110 and the digital microphone R 120 are arranged separately at the arrangement interval “X”.

As described in FIG. 4, the distance from the digital microphone L 110 to an audio source B is longer, by “the arrangement interval X”, than the distance from the digital microphone R 120 to the audio source B. Because the digital microphone L 110 is more distant from the audio source B than the digital microphone R 120 by “the arrangement interval X”, the digital microphone L 110 receives sound from “the audio source B” later than the digital microphone R 120 by a time corresponding to the “the arrangement interval X”. Therefore, when generating sound obtained by subtracting sound coming from a direction that is different from the specific direction, the audio output device 100 performs processing after adjustment for the delay amount corresponding to “the arrangement interval X”.

As an example, a case will be described in which digital audio signals obtained by subtracting sound from “AUDIO SOURCE B” coming from a direction different from sound coming from “AUDIO SOURCE A” are generated. The delay unit R 150 adds a delay amount corresponding to the “ARRANGEMENT INTERVAL X” to the digital audio signals from the digital microphone R 120. The audio output device 100 then subtracts digital audio signals from the digital microphone R 120, to which the delay amount is added, from digital audio signals from the digital microphone L 110.

The low-pass filter 160 is connected to the audio controller 200 and the output destination detector 170. The low-pass filter 160 converts the digital audio signals, which are received from the audio controller 200, to analog audio signals and transmits the converted analog audio signals to the output destination detector 170. The digital audio signals that the low-pass filter 160 receives from the audio controller 200 are post-conversion digital audio signals, i.e., digital audio signals after subtraction of the sound coming from a direction different to the specific direction.

Figure 5:
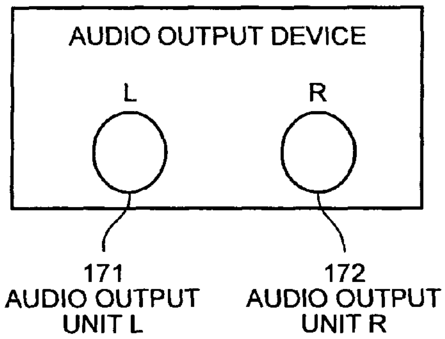
FIG. 5 is a diagram illustrating an output destination detector of the first embodiment.

The output destination detector 170 is connected to the delay unit L 140, the delay unit R 150, and the low-pass filter 160. As illustrated in FIG. 5, for example, the output destination detector 170 includes two audio output units for outputting analog audio signals, e.g., an audio output unit L 171 and an audio output unit R 172. FIG. 5 is a diagram illustrating the output destination detector of the first embodiment.

The output destination detector 170 accepts, from a user, an operation of selecting the digital audio signals from the digital microphone L 110 or the digital audio signals from the digital microphone R 120. In other words, the output destination detector 170 accepts the selection of a digital microphone to output sound that is specified out of the digital microphones of the audio output device 100. The output destination detector 170 then sets, to a predetermined delay amount, the delay unit that adds the delay amount to the digital audio signals that are specified by the operation of the user.

For example, when the microphone terminal is connected to the audio output unit L 171, the output destination detector 170 sets the delay unit R 150 to a predetermined delay amount. Thereafter, the audio controller 200, which will be described below, subtracts the digital audio signals from the digital microphone R 120, to which the delay amount is added, from the digital audio signals from the digital microphone L 110. Similarly, when the microphone terminal is connected to the audio output unit R 172, the output destination detector 170 sets the delay unit L 140 to a predetermined delay amount.

The output destination detector 170 transmits, to the audio output unit L 171 or the audio output unit R 172, the analog audio signals that are received from the low-pass filter 160. The audio output unit L 171 or the audio output unit R 172 then outputs the analog audio signals to the user.

The audio controller 200 is connected to the clock signal generator 130, the delay unit L 140, the delay unit R 150, and the low-pass filter 160. The audio controller 200 includes an internal memory for storing programs, which define various extraction control process procedures, and performs various extraction control processing. As illustrated in FIG. 2, the audio controller 200 includes a converter 210, a setting unit 220, and a subtractor 230. Each unit of the audio controller 200 corresponds to a control circuit that performs processing by using AND operations and OR operations.

Each unit of the audio controller 200 performs processing and thus the audio controller 200 generates post-conversion digital audio signals each of a half period of the predetermined period by using the Lch audio signals 10 and the Rch audio signals 10. Specifically, the audio controller 200 generates post-conversion digital audio signals in which the states of the Lch audio signals 10 are each reflected in one of the two half periods corresponding to the predetermined period and the states of the Rch audio signals 10 are each reflected in the other half period.

Hereinafter, unless otherwise noted, descriptions are provided where the user selects sound from the digital microphone L 110. In other words, the output destination detector 170 sets the delay unit R 150 to a delay amount and the audio controller 200 subtracts the digital audio signals from the digital microphone R 120, to which the delay amount is added, from the digital audio signals from the digital microphone L 110.

The converter 210 is connected to the clock signal generator 130, the delay unit L 140, the delay unit R 150, and the setting unit 220. The converter 210 receives clock signals from the clock signal generator 130, receives the Lch audio signals 10 from the delay unit L 140, and receives the Rch audio signals 10 from the delay unit R 150.

Figure 6:
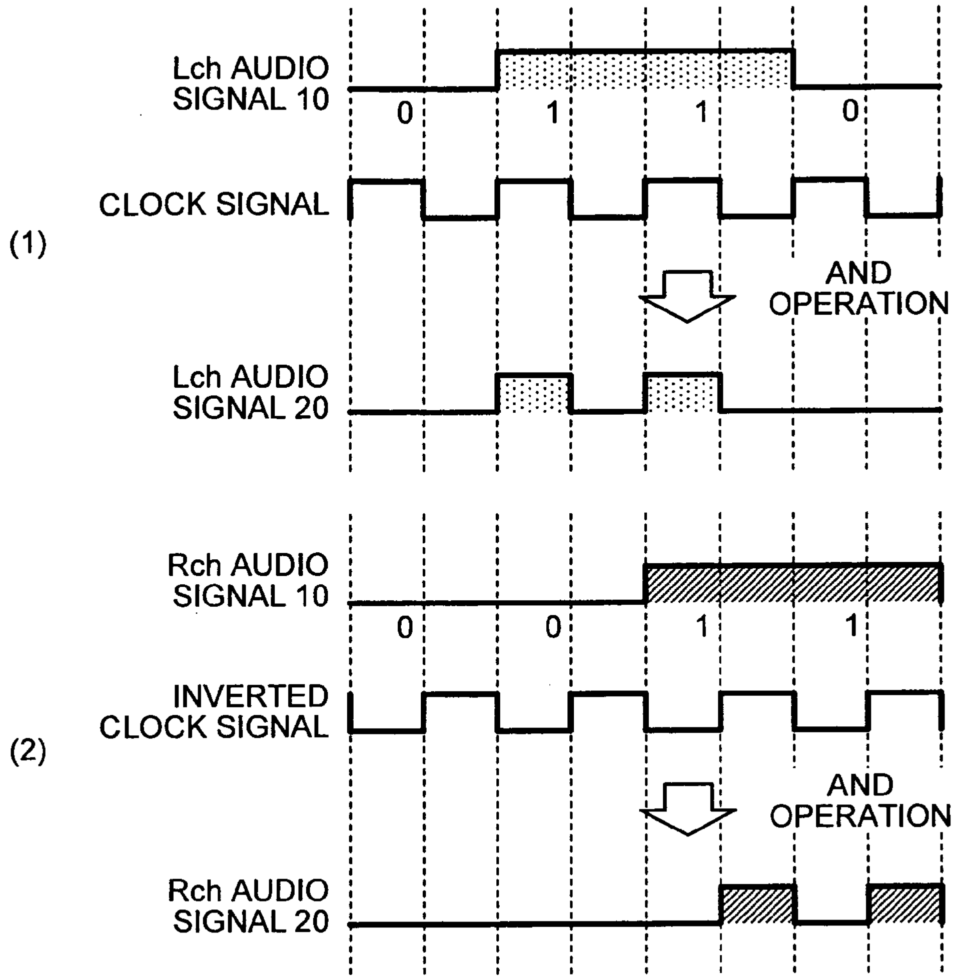
FIG. 6 is a diagram illustrating a converter of the first embodiment.

The converter 210 converts the Lch audio signals 10 to the Lch audio signals 20 and converts the Rch audio signals 10 to the Rch audio signals 20. Here, as illustrated in FIG. 6, the Lch audio signals 20 and the Rch audio signals 20 represent the same periods as those of the clock signals, and the state of the Lch audio signal and the state of the Rch audio signal are each reflected in a different period of the two periods of the clock signals corresponding to the predetermined period. FIG. 6 is a diagram illustrating the converter of the first embodiment.

Conversion of the Lch audio signals 10 to the Lch audio signals 20 and conversion of the Rch audio signals 10 to the Rch audio signals 20 are further described below.

Conversion of the Lch audio signals 10 to the Lch audio signals 20 will be described. As illustrated in (1) in FIG. 6, the converter 210 performs an AND arithmetic operation on the Lch audio signals 10 and the clock signals to convert the Lch audio signals 10 to the Lch audio signals 20. In other words, the Lch audio signals 20 are digital audio signals that are obtained as a result of the AND operations by the converter 210. The Lch audio signals 20 are digital audio signals in which the state is represented by “1” only in the periods in which the state of the Lch audio signal is represented by “1” and the state of the clock signal is represented by “1”.

Conversion of the Rch audio signals 10 to the Rch audio signals 20 will be described. As illustrated in (2) in FIG. 6, the converter 210 performs an AND arithmetic operation of the Rch audio signals 10 and inverted clock signals to convert the Rch audio signals 10 to the Rch audio signals 20. In other words, the Rch audio signals 20 are digital audio signals that are obtained as a result of the AND operations by the converter 210. The Rch audio signals 20 are digital audio signals in which the state is represented by "1" only in the periods in which the state of the Rch audio signal 10 is represented by "1" and the state of the inverted clock signal is represented by "1". In other words, the states of the Rch audio signals 20 are represented by "1" only in the periods in which the state of the Rch audio signal 10 is represented by "1" and the state of the clock signal is represented by "0".

The inverted clock signals are digital audio signals in which the states of the clock signals are changed and, more specifically, are digital audio signals in which the states are represented by "0" in the periods in which the state of the clock signal is represented by "1" and the states are represented by "1" in the periods in which the state of the clock signal is represented by "0". The period lengths of the Lch audio signals 20 and the Rch audio signals 20 are the same as that of the clock signals.

As described above, the converter 210 performs the conversion such that the period of the Lch audio signal 10 and the period of the Rch audio signal 10 are reflected respectively in the individual different periods corresponding to the two periods of the clock signals corresponding to the predetermined period.

The converter 210 transmits the Lch audio signals 20 and the Rch audio signals 20, which are obtained as a result of the conversion, to the setting unit 220.

The setting unit 220 is connected to the converter 210 and the subtractor 230. The setting unit 220 receives the Lch audio signals 20 and the Rch audio signals 20 from the converter 210.

Figure 7:
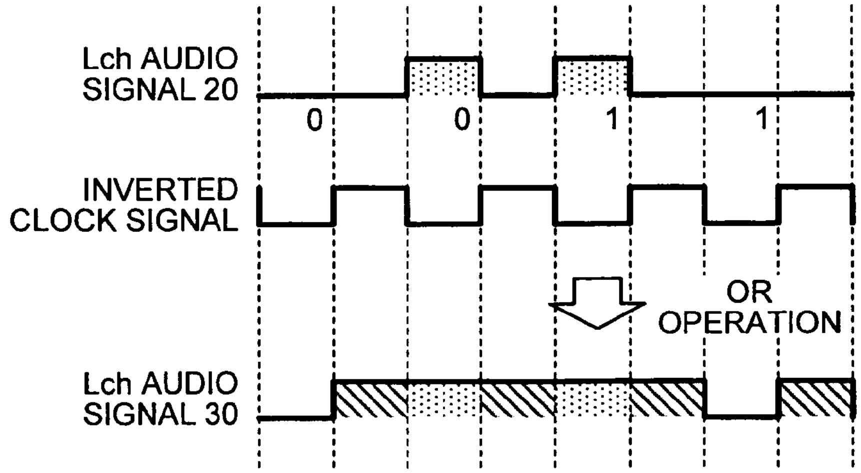
FIG. 7 is a diagram illustrating a setting unit of the first embodiment.

Among the Lch audio signals 20 and the Rch audio signals 20 that are obtained as a result of the conversion by the converter 210, regarding signals from which signals from another direction are subtracted, the setting unit 220 sets, to "1", the states of non-reflection periods that are periods that are not used for reflecting the states of their own signals. Specifically, as illustrated in FIG. 7, the setting unit 220 converts the Lch audio signals 20 to the Lch audio signals 30. In other words, the Lch audio signals 30 are digital audio signals in which the states corresponding to the non-reflection periods of the Lch audio signals 20 are set to "1". FIG. 7 is a diagram illustrating the setting unit of the first embodiment.

Conversion of the Lch audio signal 20 to the Lch audio signals 30 will be described more. As illustrated in FIG. 7, the setting unit 220 performs OR operations on the Lch audio signals 20 and inverted clock signals. In other words, the Lch audio signals 30 are digital audio signals that are obtained as a result of the OR operations performed by the setting unit 220. The Lch audio signals 30 are digital audio signals in which the states are represented by "0" in the periods in which the state of the Lch audio signal 20 is represented by "1" and in the periods in which the state of the inverted clock signal is represented by "1". In other words, the states of the Lch audio signals 30 are "0" only in the periods in which the state of the Lch audio signals 20 is represented by "0" and the state of the inverted clock signal is represented by "0".

The setting unit 220 transmits the Lch audio signals 30 and the Rch audio signals 20 to the subtractor 230.

The subtractor 230 is connected to the low-pass filter 160. The subtractor 230 receives the Lch audio signals 30 and the Rch audio signals 20 from the setting unit 220.

The subtractor 230 subtracts, from the digital audio signals from the digital microphone selected by the user, the digital audio signals from the other digital microphone, and, more specifically, subtracts the Rch audio signals 20 from the Lch audio signals 30. Here, the digital audio signals that are obtained as a result of the processing by the subtractor 230 are the post-conversion digital audio signals.

Figure 8:
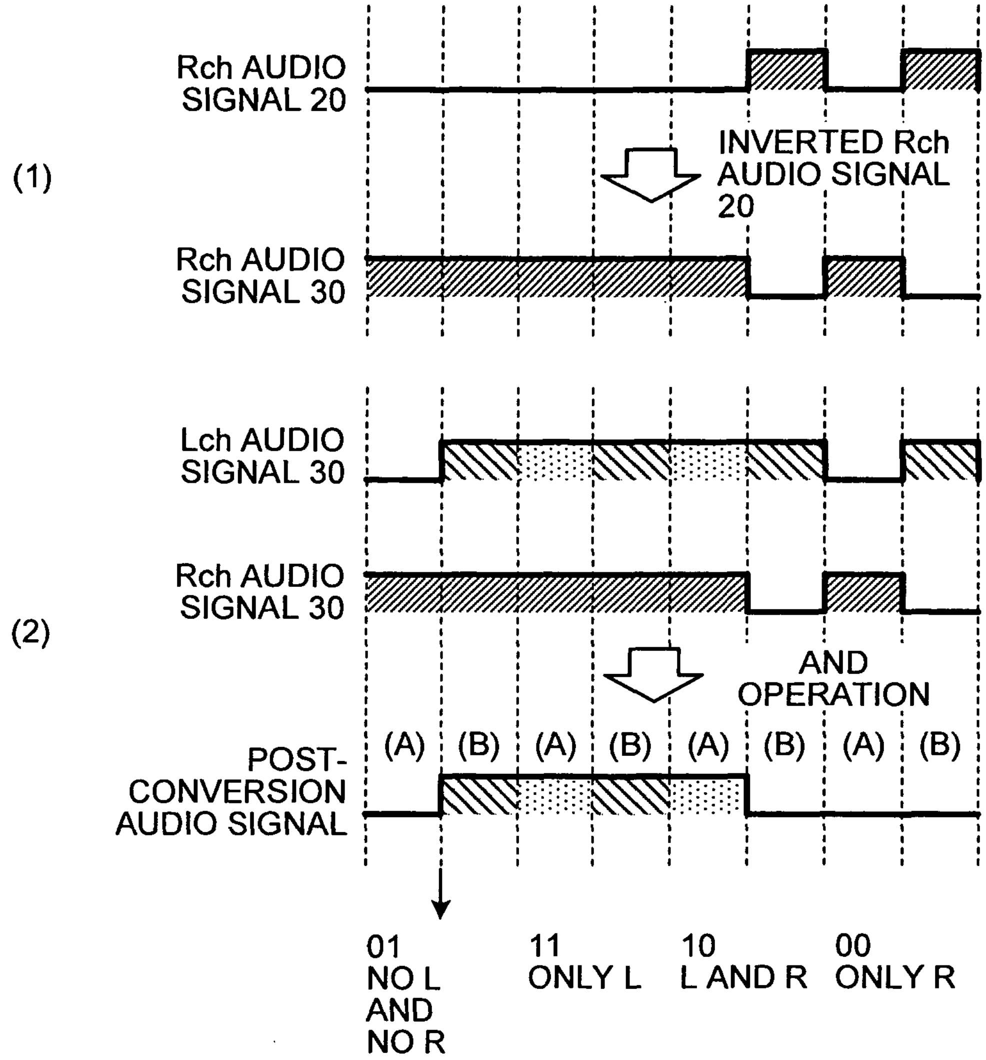
FIG. 8 is a diagram illustrating a subtractor of the first embodiment.

Subtraction of the Rch audio signals 20 from the Lch audio signals 30 will be described using FIG. 8. FIG. 8 is a diagram illustrating the subtractor of the first embodiment. The subtractor 230 performs subtraction processing by using AND operations and OR operations, and, more specifically, as illustrated in FIG. 8, performs AND operations on the Lch audio signals 30 and the inverted Rch audio signals 20 (hereinafter, Rch audio signals 30). Here, the results of the AND operations performed by the subtractor 230 serve as the post-conversion digital audio signals.

As illustrated in (1) in FIG. 8, the subtractor converts the Rch audio signals 20 to the Rch audio signals 30. The Rch audio signals 30 are digital audio signals in which the states are represented by "0" in the periods in which the state of the Rch audio signal 20 is represented by "1" and where the states are "1" in the periods in which the state of the Rch audio signals 20 is represented by "0".

As illustrated in (2) in FIG. 8, the subtractor 230 performs AND operations on the Lch audio signals 30 and the Rch audio signals 30. In other words, the post-conversion digital audio signals are digital audio signals that are obtained as a result of the AND operations performed by the subtractor 230. The post-conversion digital audio signals are digital audio signals in which the states are represented by "1" only in the periods in which the state of the Lch audio signal 30 is represented by "1" and the state of the Rch audio signal 30 is represented by "1".

The post-conversion digital audio signals are signals in which the states of the Lch audio signals 10 are each reflected in one of the two half periods corresponding the predetermined period and the states of the Rch audio signals 10 are each reflected in the other half period. For example, the states of the Lch audio signal 10 are reflected in the periods indicated by "A" in FIG. 8. If the state of the Lch audio signal 10 is "1", the state of the post-conversion digital audio signal is "1", and if the state of the Lch audio signal is "0", the state of the post-conversion digital audio signal is "0". The states of the Rch audio signal 10 are reflected in the periods indicated by "B" in FIG. 8. If the state of the Rch audio signal 10 is "1", the state of the post-conversion digital audio signal is "0", and if the state of the Rch audio signal is "0", the state of the post-conversion digital audio signal is "1".

Accordingly, the post-conversion digital audio signals express "1(=1−0)", "0(=1−1, 0−0)", and "−1(=0−1)", which can be processing results of extracting sound, in different forms, from the specific direction.

In other words, as indicated by "L AND R" of the "POST-CONVERSION DIGITAL AUDIO SIGNAL" of FIG. 8, when the state of the Lch audio signal 10 is represented by "1" and the state of the Rch audio signal 10 is represented by "1", the state is represented by "10". As indicated by "NO L and NO R" in FIG. 8, when the state of the Lch audio signal 10 is represented by "0" and the state of the Rch audio signal 10 is represented by "0", the state is represented by "01". As indicated by "ONLY L" in FIG. 8, when the state of the Lch audio signal 10 is represented by "1" and the state of the Rch audio signal 10 is represented by "0", the state is represented by "11". As indicated by "ONLY R" in FIG. 8, when the state of the Lch audio signal 10 is represented by "0" and the state of the Rch audio signal 10 is represented by "1", the state is represented by "00".

In other words, the post-conversion digital audio signals represent the processing result of each period using two bits and thus can reflect the processing results more accurately compared with the conventional digital audio signals that represents only "1" or "0" as a processing result.

In pulse density modulation, the signal state is represented by the density of 1s and 0s in a predetermined time (allocation). Thus, two bits of each period "10 (L and R)" and "01 (NO L and NO R)" are different in the arrangement but include one "1" and thus represent the same state.

The subtractor 230 transmits post-conversion audio signals to the low-pass filter 160. The low-pass filter 160 then converts the post-conversion digital audio signals to analog audio signals and then the audio signals are output. The variations of the density of 1s and 0s over a long time with respect to the code clock are extracted via the low-pass filter and then decoded into analog audio signals. Thus, accurate density representation leads to satisfactory results.

Overall Processing of Audio Output Device

Figure 9:
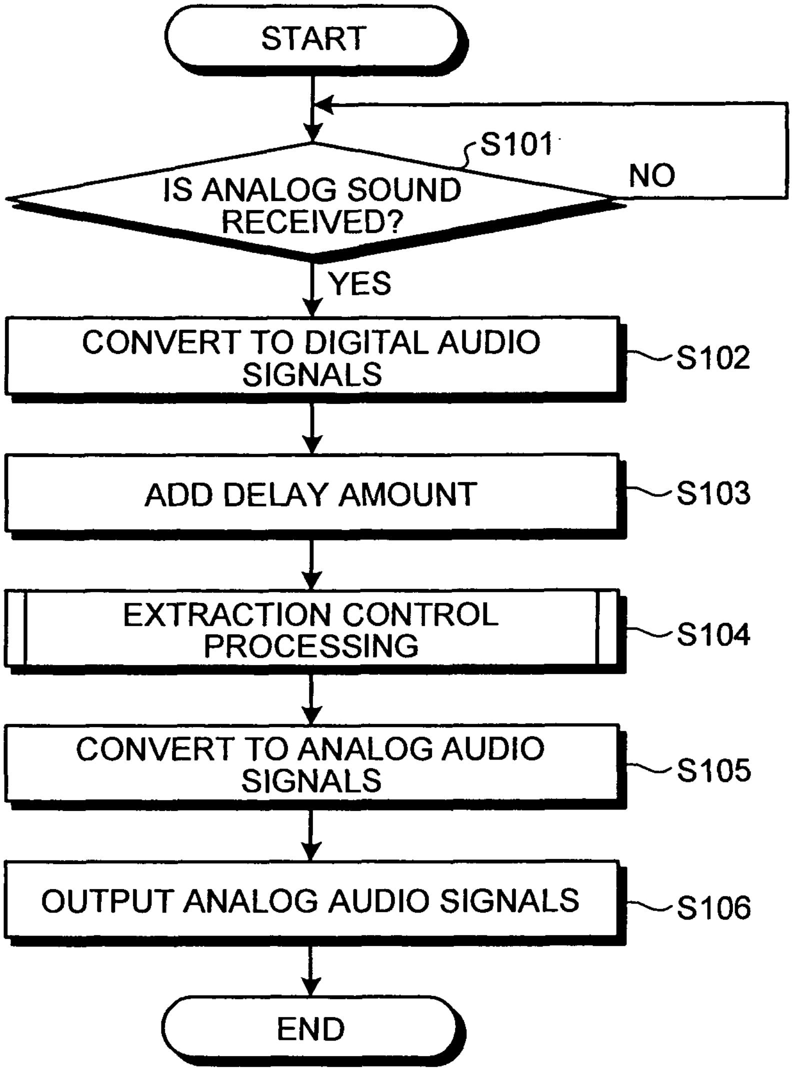
FIG. 9 is a flowchart illustrating an example of the flow of the overall processing of the audio output device according to the first embodiment.

An example of an overall processing of the audio output device 100 according to the first embodiment will be described using FIG. 9. FIG. 9 is a flowchart illustrating an example of a flow of the overall processing of the audio output device according to the first embodiment.

As illustrated in FIG. 9, in the audio output device 100, once the digital microphone L 110 or the digital microphone R 120 receives analog sound (YES at step S101), the received analog sound is converted to a digital audio signal by using PMD (step S102). In the audio output device 100, the delay unit R 150 then adds a delay amount to the Rch audio signals 10 (step S103).

In the audio output device 100, the audio controller 200 performs the extraction control processing (step S104). In other words, the audio controller 200 generates post-conversion digital audio signals. In the audio output device 100, the low-pass filter 160 then converts the post-conversion digital audio signals, which are obtained through the extraction control processing, to analog audio signals (step S105) and the output destination detector 170 outputs the analog audio signals (step S106).

Subtraction Processing of Audio Output Device

Figure 10:
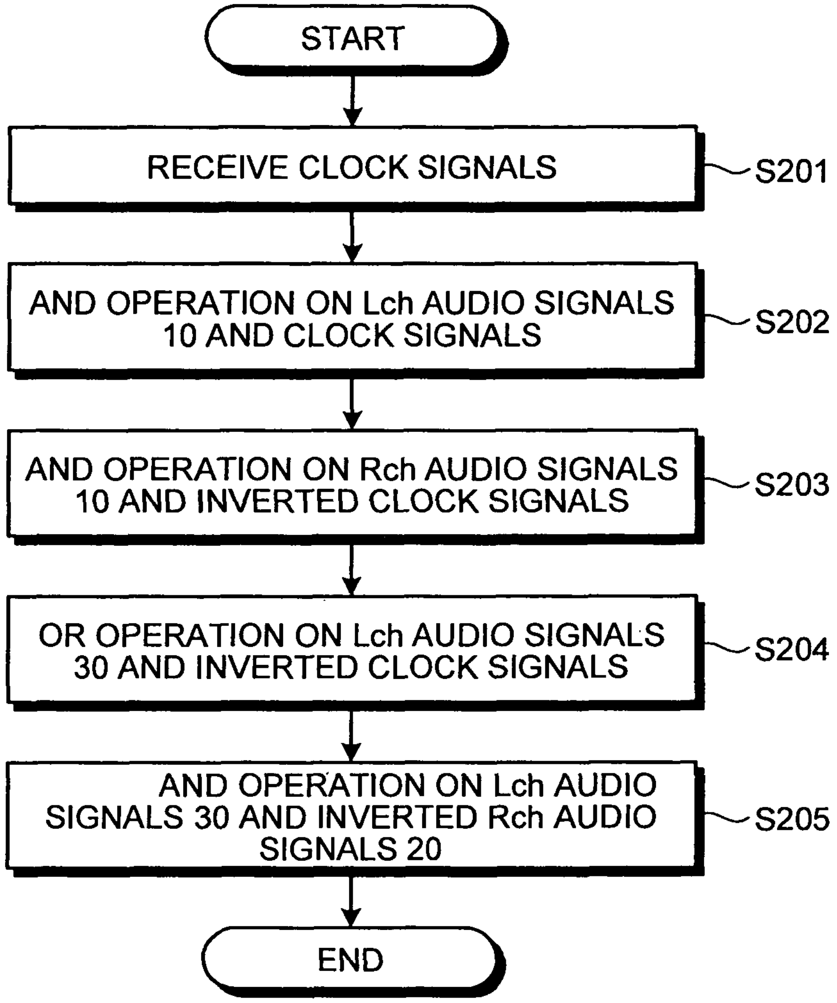
FIG. 10 is a flowchart illustrating an example of the flow of extraction control processing of the audio controller in the first embodiment.

An example of the flow of the extraction control processing of the audio controller 200 will be described using FIG. 10. FIG. 10 is a flowchart illustrating an example of the flow of the extraction control processing of the audio controller according to the first embodiment. Each step in FIG. 10 corresponds to step S104 in FIG. 9.

As illustrated in FIG. 10, in the audio controller 200, the converter 210 receives clock signals from the clock signal generator 130 (step S201) and performs AND operations on the Lch audio signals 10 and the clock signals (step S202). In other words, the converter 210 converts the Lch audio signals 10 to Lch audio signals 20. The converter 210 performs AND operations on the Rch audio signals 10 and the inverted clock signals (step S203). In other words, the converter 210 converts the Rch audio signals 10 to the Rch audio signals 20.

The setting unit 220 performs OR operations on the Lch audio signals 20 and the inverted clock signals (step S204). In other words, the setting unit 220 converts the Lch audio signals 20 to the Lch audio signals 30.

The subtractor 230 then performs AND operations on the Lch audio signals 30 and the inverted Rch audio signals 20 (step S205). In other words, the subtractor 230 generates the post-conversion digital audio signals.

Effects of First Embodiment

As described above, according to the first embodiment, the audio output device 100 receives the Lch audio signals 10 and the Rch audio signals 10. The audio output device 100 generates the post-conversion digital audio signals using the Lch audio signals 10 and the Rch audio signals 10. Accordingly, the audio quality can be prevented from deteriorating due to the processing of extracting sound coming from a specific direction. Specifically, by expressing the processing results using two bits for each predetermined period, "1", "0", and "−1" that can serve as processing results can be output as individual different digital audio signals, which prevents the audio quality from deteriorating.

In other words, synchronous subtraction is used as a signal processing method for realizing directionality in the device that includes multiple digital microphones. If the digital audio signals that are output from the digital microphones are ΔΣ modulation signals, for example, random-bit signal processing is performed in the synchronous subtraction. In the conventional random-bit signal processing, however, "−1" is not represented during subtraction and thus the original sound is not reproduced authentically.

In contrast, according to the first embodiment, the audio quality of the microphone array can be increased using a simple configuration and thus a high-performance audio receiving device can be provided.

Digital microphones are, for example, used in a vehicle and are arranged on the ceiling near the rear-view mirror. The digital microphones acquire only sound coming from the direction of the driver and transmit the acquired sound to, for example, an audio input unit of a navigation device. The inside of the vehicle is an audio environment with a wide dynamic range where the states of signals that are output by using PDM are often represented by "1". In other words, the quality frequently deteriorates due to processing for extracting sound coming from a specific direction, which hinders authentic reproduction of the original sound.

In contrast, according to the first embodiment, the audio quality can be prevented from deteriorating by using a simple configuration without causing an operation error in the digital processing even in an audio environment with a wide dynamic range, such as the inside of a vehicle.

According to the first embodiment, the audio controller 200 performs all the processing by using digital audio signals. Accordingly, compared to the case where analog audio signals are used, the circuit configuration can be simplified and the processing rate can be increased.

According to the first embodiment, the audio output device 100 adds a predetermined delay amount to digital audio signals, which are specified by an operation of a user, to generate post-conversion digital audio signals. Thus, the audio output device 100 can easily accept selection by the user and selectively output the selected digital audio signals.

[b] Second Embodiment

In the first embodiment, the case is described where the extraction control processing is performed using digital audio signals. In a second embodiment of the present invention, a case will be described where extraction control processing is performed not using digital audio signals but using analog audio signals.

The idea of the second embodiment will be briefly described here. When analog audio signals are converted to digital audio signals, quantization noise occurs in the digital audio signals. In addition, when arithmetic operation processing is performed using digital audio signals that contain quantization noise, arithmetic operation processing errors due to quantization noise are accumulated in the digital audio signals that are obtained as a result of the arithmetic operations. Accumulation of digital arithmetic operation processing errors causes musical noise in digital audio signals.

Musical noise is noise that occurs at frequencies corresponding to sound in the frequency band of the human voice. Occurrence of musical noise lowers the audio quality and makes it difficult to distinguish human voices that are contained in digital audio signals.

No musical noise occurs if all the units that constitute the audio output device 100 are configured as an analog circuit and all the processing is performed using only analog audio signals without digital audio signals. However, a digital circuit is generally used to increase calculation accuracy, reduce costs, and increase reliability, and thus the use of an analog circuit and analog signals is not realistic.

In the second embodiment, the audio output device 100 that reduces the occurrence of musical noise by using a digital circuit will be described. Descriptions for the same aspects as those of the audio output device 100 according to the first embodiment will be omitted below.

Specifically, the audio output device 100 according to the second embodiment converts analog audio signals to digital audio signals and then converts the digital audio signals to a frequency axis or a time axis of the digital audio signals. The audio output device 100 converts the converted digital audio signals to analog audio signals and then performs extraction control processing on the analog audio signals.

Figure 11:
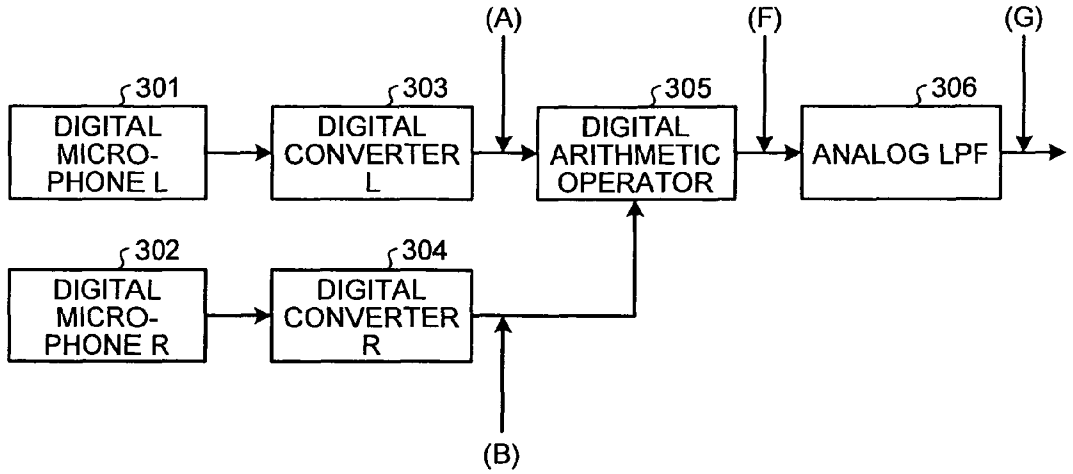
FIG. 11 is a diagram illustrating a case where arithmetic operation processing is performed using digital audio signals.
Figure 12:
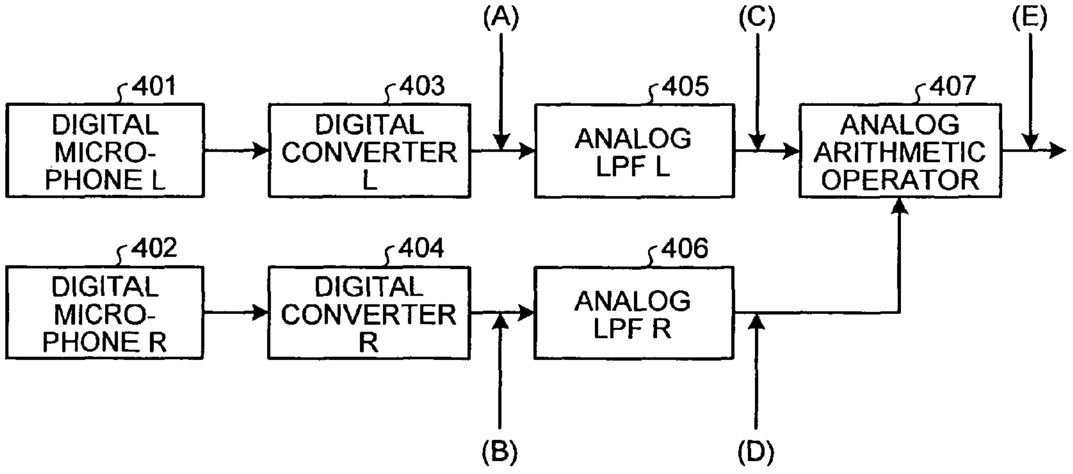
FIG. 12 is a diagram illustrating an audio output device according to a second embodiment of the present invention.

The audio output device 100 according to the second embodiment will be described while comparing it to the case where arithmetic operation processing is performed using digital audio signals. In other words, a case will be described where, after conversion to analog audio signals, arithmetic operation processing is performed. FIG. 11 is a diagram illustrating a case where operation processing is performed using digital audio signals. FIG. 12 is a diagram illustrating the audio output device 100 according to the second embodiment.

Hereinafter, the case where operation processing is performed using digital audio signals is described by describing, as an example, a case where the device includes a digital microphone L 301, a digital microphone R 302, a digital converter L 303, a digital converter R 304, a digital arithmetic operator 305, and an analog LPF 306.

As illustrated in FIG. 12, the audio output device 100 according to the second embodiment will be described by describing, as an example, a case where the audio output device 100 includes a digital microphone L 401, a digital microphone R 402, a digital converter L 403, a digital converter R 404, an analog LPF L 405, an analog LPF R 406, and an analog arithmetic operator 407.

As illustrated in FIG. 11, upon receiving digital audio signals from the digital microphone L 301, the digital converter L 303 transforms the received digital audio signals to a frequency axis or a time axis. The digital converter L 303 outputs the converted digital audio signals.

Each of the digital microphones converts analog audio signals to digital audio signals by using pulse width modulation (PWM) and PDM. Each of the digital converters performs conversion by using a Fourier transform, Z transform, or Laplace transform.

The digital converter R 304, the digital converter L 403, the digital converter R 404 perform processing similar to that of the digital converter L 303.

Figure 13:
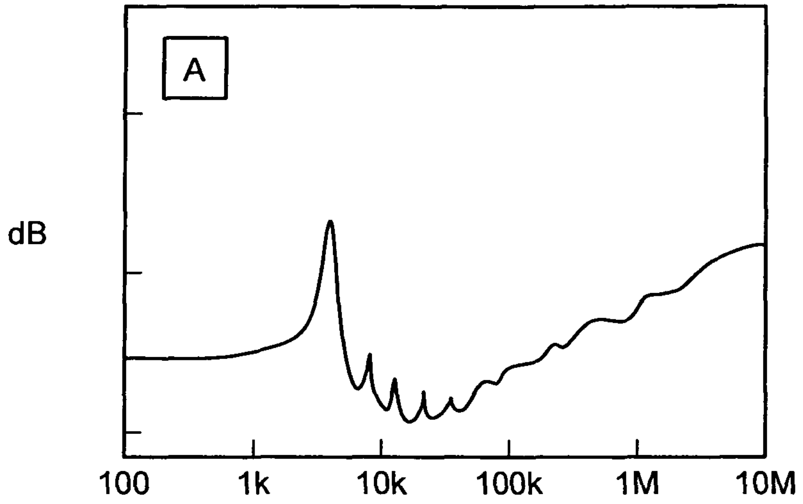
FIG. 13 is a graph illustrating an example of converted digital audio signals that are output from a digital converter.
Figure 14:
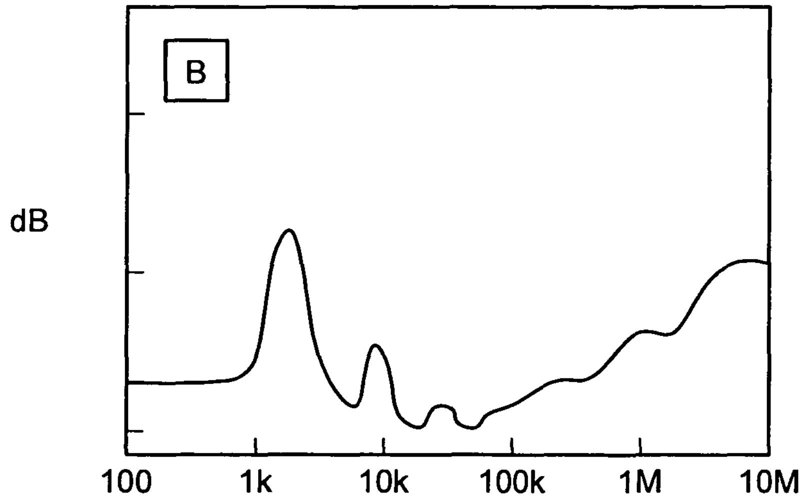
FIG. 14 is a graph illustrating another example of converted digital audio signals that are output from the digital converter.

For example, as illustrated in FIG. 13 and FIG. 14, the digital converter L 303 and the digital converter R 304 output digital audio signals that are converted to a frequency axis is performed.

FIG. 13 is a graph illustrating an example of converted digital audio signals that are output from a digital converter and the graph corresponds to, for example, the waveform of the digital audio signals of "A" in FIG. 11 or FIG. 12. FIG. 14 is a graph illustrating an example of converted digital audio signals that are output from a digital converter and the graph corresponds to, for example, the waveform of the digital audio signals of "B" in FIG. 11 or FIG. 12. As illustrated in FIG. 13 or FIG. 14, the horizontal axis indicates the frequency (Hz) and the horizontal axis indicates the signal intensity (dB).

As illustrated in FIG. 12, in the audio output device 100 according to the second embodiment, the analog LPF L 405 converts the digital audio signals that are output from the digital converter L 403 to analog audio signals and outputs the analog audio signals to the analog arithmetic operator 407. The analog LPF R 406 performs processing similar to that of the analog LPF L 405.

Figure 15:
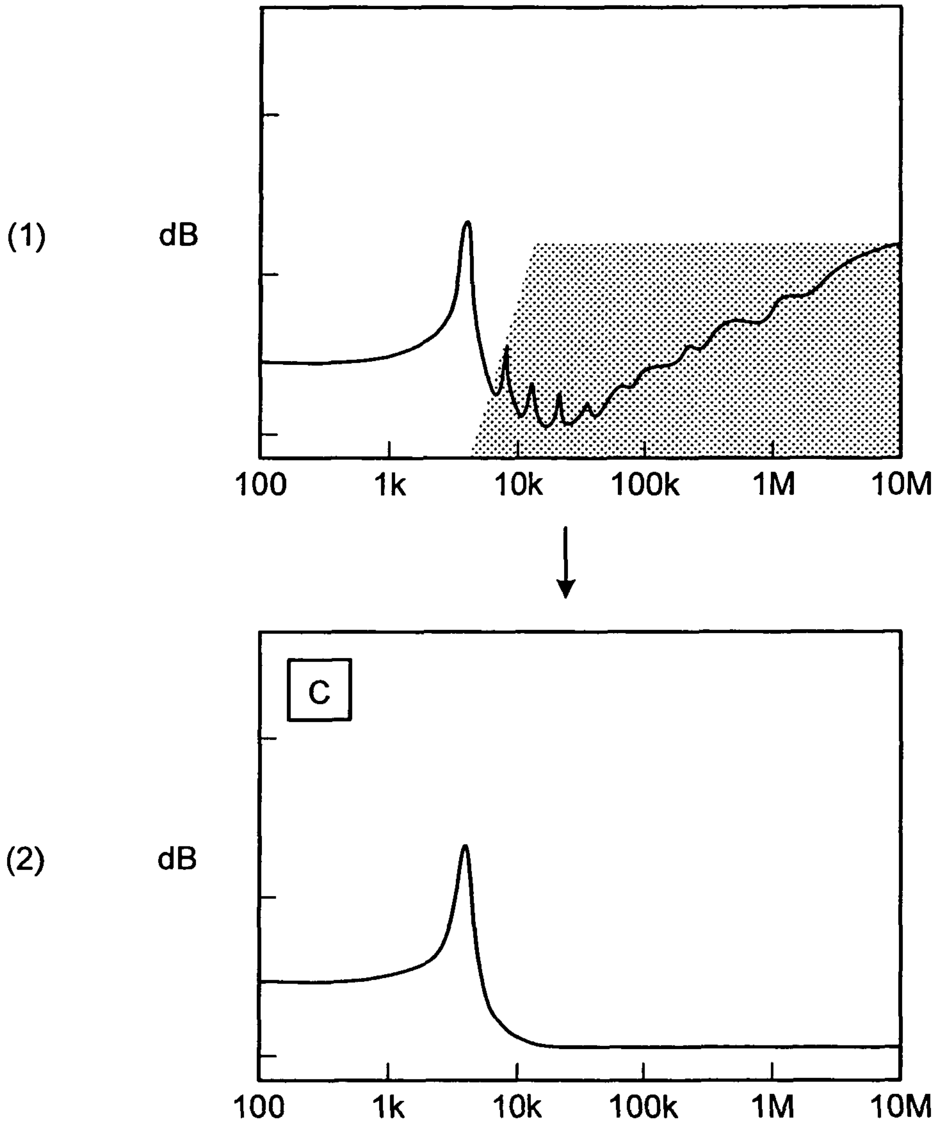
FIG. 15 contains graphs illustrating deletion of high-frequency components by an analog LPF.
Figure 16:
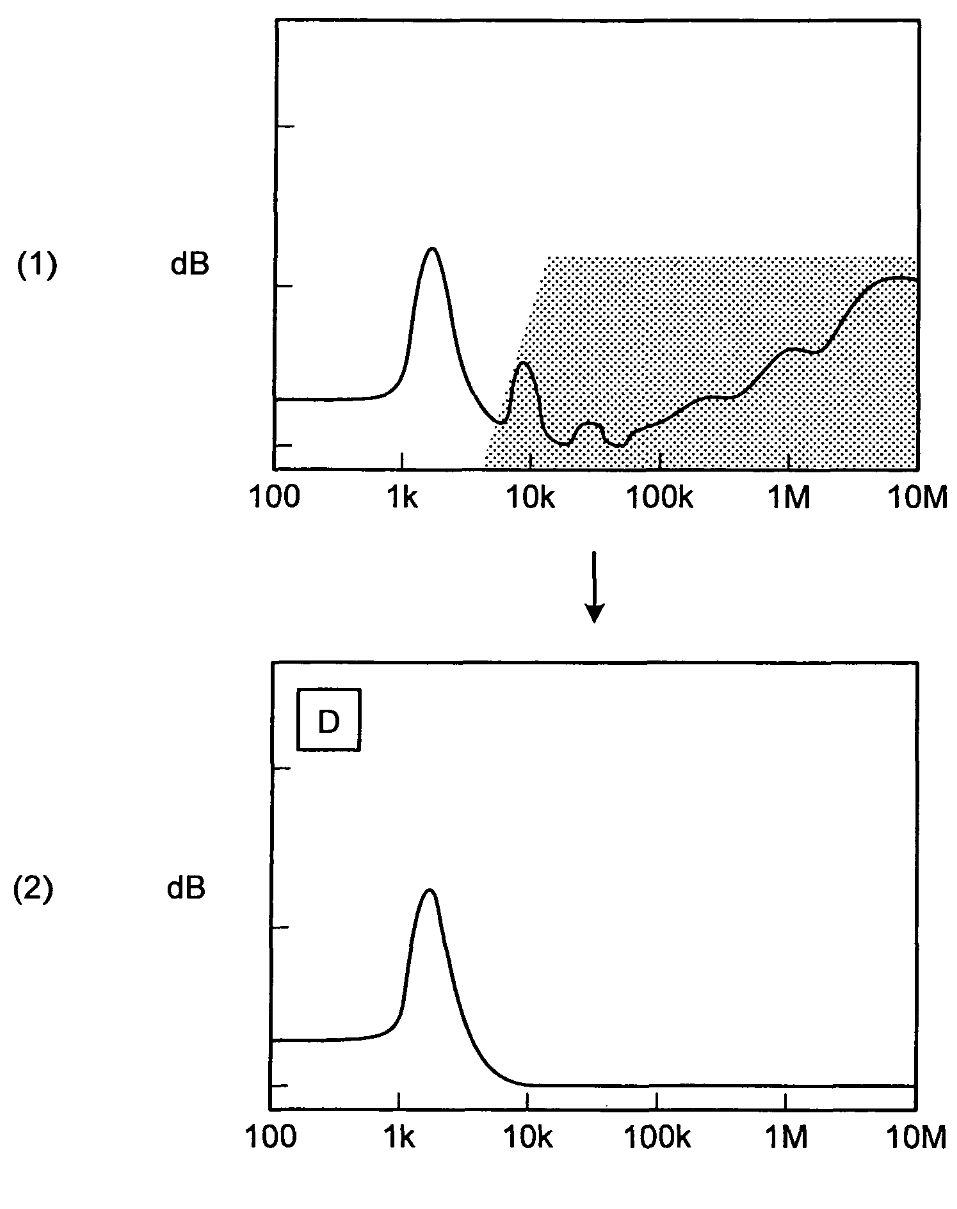
FIG. 16 contains graphs illustrating another deletion of high-frequency components by an analog LPF.

The analog LPF L 405 and the analog LPF R 406 convert digital audio signals to analog audio signals and, during the conversion, cut high-frequency components corresponding to the shaded portion in the graph (1) of FIG. 15 or the graph (2) of FIG. 16. Accordingly, as illustrated in the graph (2) of FIG. 15 or the graph (2) of FIG. 16, the analog LPF L 405 and the analog LPF R 406 output analog audio signals from which the high-frequency components have been cut.

FIG. 15 and FIG. 16 contain graphs illustrating deletion of high-frequency components by an analog LPF. The graph (2) of FIG. 15 corresponds to the waveform of analog audio signals of "C" in FIG. 12 and the graph (2) of FIG. 16 corresponds to the waveform of analog audio signals of "D" in FIG. 12.

As illustrated in FIG. 12, in the audio output device 100 according to the second embodiment, the analog arithmetic operator 407 receives analog audio signals from the analog LPF L 405 or the analog LPF R 406 and performs arithmetic operation processing thereon. For example, the analog arithmetic operator 407 performs extraction control processing and performs four arithmetic operations, differentiation, and integration. Add processing enhances sound coming from a specific direction and subtraction processing reduces the sound. Differentiation enhances high-pitched sound and integration enhances low-pitched sound.

Figure 17:
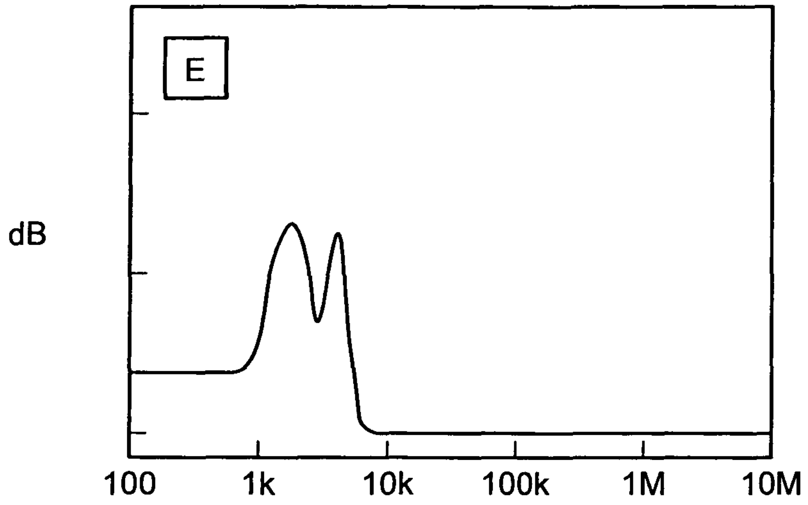
FIG. 17 is a graph of the waveform of analog audio signals that are output from the audio output device according to the second embodiment.

As illustrated in FIG. 17, in the audio output device 100 according to the second embodiment, the analog arithmetic operator 407 outputs analog audio signals obtained as a result of arithmetic operations. FIG. 17 is a graph of a waveform of analog audio signals that are output from the audio output device 100 according to the second embodiment. FIG. 17 represents an example of the waveform of the analog audio signals obtained by add processing of the audio output device 100.

As illustrated in FIG. 17, the analog arithmetic operator 407 outputs analog audio signals that contain only peaks originating from the waveforms in FIG. 15 and FIG. 16. FIG. 17 corresponds to the waveform of the analog audio signals of "E" in FIG. 11.

In contrast, in the device that performs arithmetic operation processing by using digital audio signals, the digital arithmetic operator 305 receives digital audio signals from the digital converter L 303 or the digital converter R 304 and performs arithmetic operation processing thereon.

Figure 18:
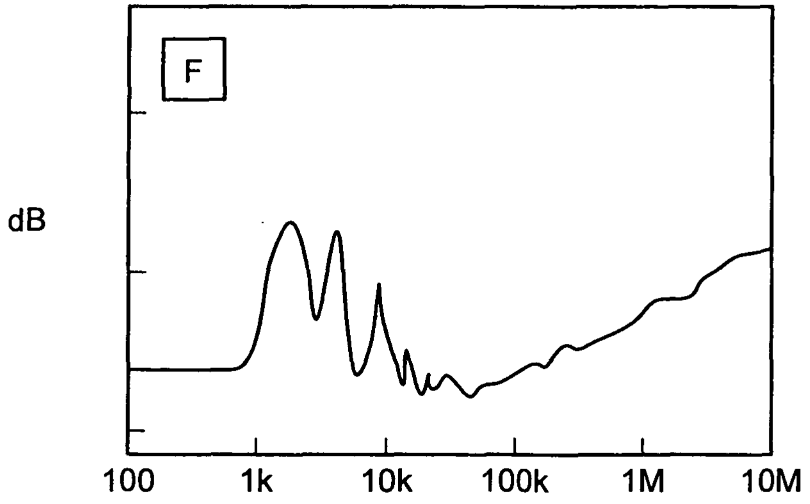
FIG. 18 is a graph illustrating digital audio signals that are output from a digital arithmetic operator.

The digital arithmetic operator 305 performs arithmetic operation processing by using digital audio signals from which no high-frequency components are deleted by an analog LPF. As a result, as illustrated in FIG. 18, digital audio signals that are output from the digital arithmetic operator 305 contain high-frequency components that are contained in the digital audio signals from the digital converter L 303 or the digital converter R 304. FIG. 18 is a graph illustrating digital audio signals that are output from the digital arithmetic operator 305. FIG. 18 corresponds to the waveform of the analog audio signals of "F" in FIG. 11.

Figure 19:
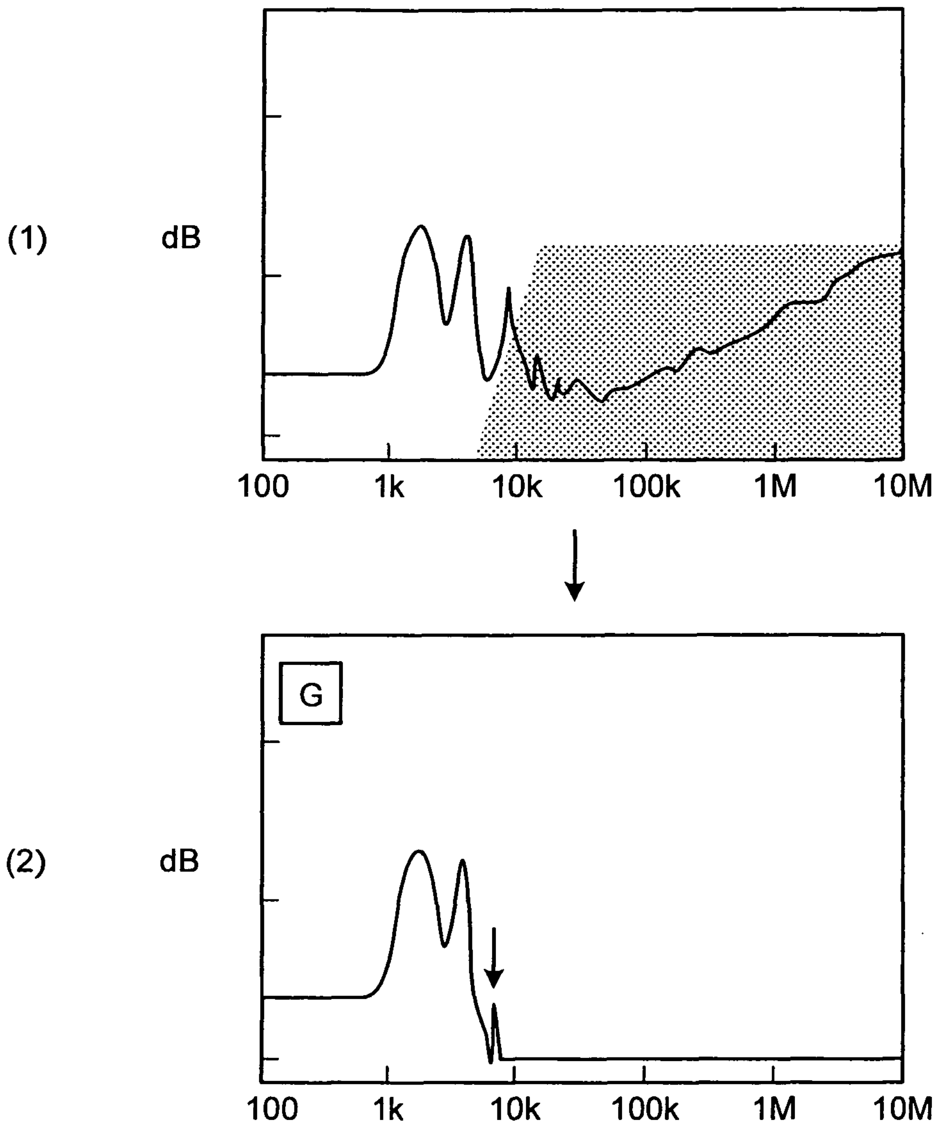
FIG. 19 contains graphs illustrating an example of audio signals that are output when arithmetic operation processing is performed using digital audio signals.

In the device that performs arithmetic operation processing by using digital audio signals, the analog LPF 306 receives the digital audio signals that are output by the digital arithmetic operator 305, converts the digital audio signals to analog audio signals, and cuts high-frequency components corresponding to the shaded portion in the graph (1) of FIG. 19. FIG. 19 contains graphs illustrating an example of audio signals that are output when arithmetic operation processing is performed using digital audio signals.

As a result, which is different to the case of the audio output device 100 according to the second embodiment (see FIG. 17), in the device that performs arithmetic operation processing by using digital audio signals, the analog LPF 306 outputs analog audio signals that contain noise indicated by the arrow in the graph (2) of FIG. 19. The noise indicated by the arrow in FIG. 19 is at a frequency corresponding to the sound of the frequency band of the human voice, i.e., the noise is musical noise. The graph (2) of FIG. 19 corresponds to the waveform of the analog audio signals of "G" in FIG. 11.

The waveforms that are used for describing the second embodiment are the waveforms that are observed under the specific following conditions. The directionality of the microphone array is 6 dB with respect to a microphone 111 direction. The specifications of the microphones are as follows: distance between microphones, 31 mm; PDM sampling rate, 1.4 MHz; Z transform processing, 91 μsec delay; analog LPF, fourth-order Bessel; cut-off frequency, 5.5 kHz; and analog arithmetic operation, add operation.

Effects of Second Embodiment

According to the second embodiment, transformation to the frequency axis or transformation to the time axis are performed using digital audio signals and, after conversion to analog audio signals, arithmetic operation processing is performed thereon. This reduces the occurrence of musical noise.

Specifically, when arithmetic operation processing is performed using digital audio signals that contain high-frequency components that are noise, the analog LPF 306 thereafter sometimes does not cut the high-frequency components properly, which causes musical noise. In the second embodiment, on the other hand, digital audio signals are converted to analog audio signals and high-frequency components that are noise are cut before arithmetic operation processing. Thus, by using arithmetic operation processing, occurrence of noise due to high-frequency components, which are noise, can be reduced. Accordingly, according to the second embodiment, occurrence of musical noise can be reduced, which improves the audio quality of analog audio signals that are output.

According to the second embodiment, conversion to analog audio signals prior to repetitive arithmetic operations reduces most quantization noise which prevents musical noise from occurring (Non-patent Document: "ΔΣ analog/digital converter", Translation supervisors: WAHO and YASUDA, p 7, 2007, Maruzen).

[c] Third Embodiment

The embodiments of the present invention are described above. The present invention can be carried out in embodiments other than the above-described embodiments. Other embodiments will be described below.

Output Destination Detector

For example, in the first embodiment, the case is described where a delay unit that is specified by the output destination detector 170 adds a predetermined delay amount. However, the present invention is not limited to this. For example, in the audio output device 100, each delay unit may keep transmitting, to the audio controller 200, digital audio signals to which a predetermined delay amount is added and digital audio signals to which the predetermined delay amount is not added.

System Configuration

Among the above-described processing according to the embodiments, the processes that are described as those automatically performed may be manually performed entirely or partially. Alternatively, the processes that are described as those performed manually may be automatically performed entirely or partially using a well-known method. The process procedures, control procedures, and specific names, which are illustrated in the specification and the drawings, and information including the various types of data and parameters (for example, FIG. 1 to FIG. 10) may be changed arbitrarily unless otherwise noted.

The elements of each device illustrated in the drawings are functional ideas and do not need to be physically configured as illustrated in the drawings. In other words, the specific modes of separation or integration of each device are not limited to those illustrated in the drawings and the elements may be configured in a way that they are entirely or partially separated or integrated functionally or physically per arbitrary unit in accordance with various loads or how they are used.

The audio quality can be prevented from deteriorating.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An audio control device comprising:

a digital audio signal receiver that receives first digital audio signals and second digital audio signals that are PDM digital audio signals in which a state is represented by 1 or 0 in each predetermined period, signal state of the PDM digital audio signals being represented by density of 1 and 0 in a predetermined time; and a generator that generates half-period digital audio signals, which are signals of a half period of the predetermined period and in which a state is represented by 1 or 0 in each half period, by reflecting the states of the first digital audio signals in one of corresponding two half periods, setting 1 in the other all half periods, and subtracting the states of the second audio signals from the corresponding other half periods, wherein, when the state of the first digital audio signal is 1 and the state of the second digital audio signal is 0, the generator generates the half-period digital audio signals whose states of the two half periods corresponding to the predetermined period are 1 1, respectively, when the states of both the first digital audio signal and the second audio signal are either 1 or 0, the generator generates the half-period digital audio signals whose states of the two half periods corresponding to the predetermined period are 1 0 or 0 1, respectively, and when the state of the first digital audio signal is 0 and the state of the second digital audio signal is 1, the generator generates the half-period digital audio signals whose states of the two half periods corresponding to the predetermined period are 0 0, respectively.

2. An audio output device comprising:

two digital microphone units that, upon receiving sound, convert the sound to PDM digital audio signals in which a state is represented by 1 or 0 in each predetermined period, signal state of the PDM digital audio signals being represented by density of 1 and 0 in a predetermined time;

a generator that generates half-period digital audio signals, which are signals of a half period of the predetermined period and in which a state is represented by 1 or 0 in each half period, by reflecting the states of the first digital audio signals in one of corresponding two half periods, setting 1 in the other all half periods, and subtracting the states of the second audio signals from the corresponding other half periods; and an output unit that converts the half-period digital audio signals, which are generated by the generator, to analog audio signals and outputs the analog audio signals, wherein, when the state of the first digital audio signal is 1 and the state of the second digital audio signal is 0, the generator generates the half-period digital audio signals whose states of the two half periods corresponding to the predetermined period are 1 1, respectively, when the states of both the first digital audio signal and the second audio signal are either 1 or 0, the generator generates the half-period digital audio signals whose states of the two half periods corresponding to the predetermined period are 1 0 or 0 1, respectively, and when the state of the first digital audio signal is 0 and the state of the second digital audio signal is 1, the generator generates the half-period digital audio signals whose states of the two half periods corresponding to the predetermined period are 0 0, respectively.

3. The audio output device according to claim 2 further comprising:

an accepting unit that accepts, from a user, an operation of specifying the first digital audio signals or the second digital audio signals; and a delay unit that adds a predetermined delay amount, which corresponding to a difference between first distance from fist microphone of the two digital microphone units to an audio source and second distance from second microphone of the two digital microphone units to the audio source, to the digital audio signals that are specified by the operation that is accepted by the accepting unit, wherein the generator generates the half-period digital audio signals by using the digital audio signals to which the delay amount is added by the delay unit and by using the other digital audio signals.

4. The audio control device according to claim 1 further comprising:

an accepting unit that accepts, from a user, an operation of specifying the first digital audio signals or the second digital audio signals; and a delay unit that adds a predetermined delay amount, which corresponding to a difference between first distance from fist microphone to an audio source and second distance from second microphone to the audio source, to the digital audio signals that are specified by the operation that is accepted by the accepting unit, wherein, the digital audio signal receiver receives first digital audio signals and second digital audio signals from the microphones.

5. The audio control device according to claim 4, wherein, the first microphone and the second microphone are in a vehicle, and the audio source is a driver of the vehicle.

* * * * *

UNITED STATES PATENT AND TRADEMARK OFFICE

CERTIFICATE OF CORRECTION

PATENT NO. : 8,718,299 B2
APPLICATION NO. : 13/067682
DATED : May 6, 2014
INVENTOR(S) : Hideki Nishimura et al.

It is certified that error appears in the above-identified patent and that said Letters Patent is hereby corrected as shown below:

In the Claims:

Column 16, Line 13, in Claim 3, delete “fist” and insert -- first --, therefor.
Column 16, Line 30, in Claim 4, delete “fist” and insert -- first --, therefor.

Signed and Sealed this
Twenty-second Day of July, 2014

Michelle K. Lee

Michelle K. Lee
*Deputy Director of the United States Patent and Trademark Office*